Nov. 29, 1960 M. W. DUNDORE ET AL 2,961,830
HYDRAULIC TORQUE CONVERTER
Filed Jan. 7, 1957 19 Sheets-Sheet 1

Inventors.
Marvin W. Dundore.
Raymond C. Schneider.
By John O. Darley
Attorney

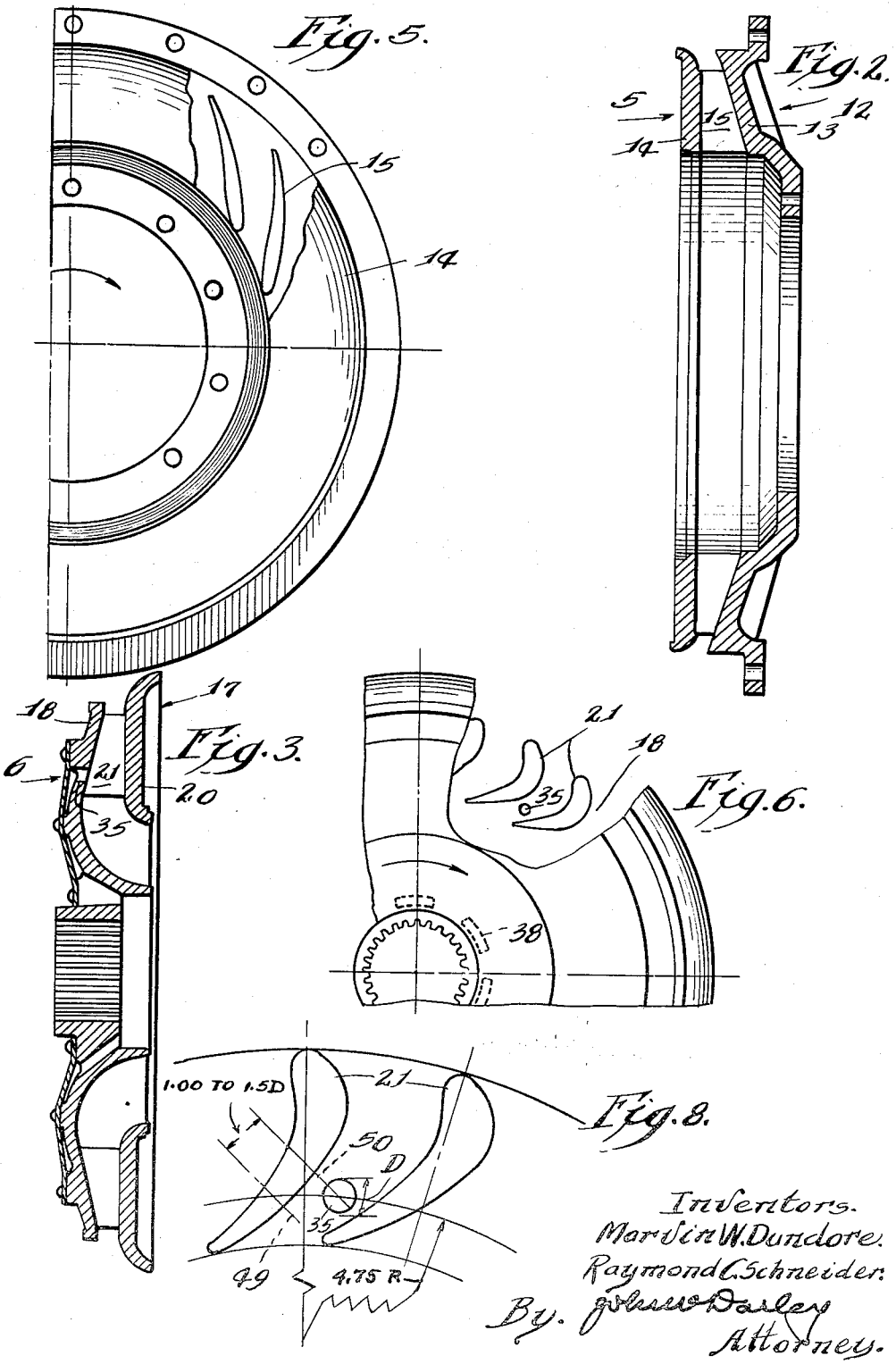

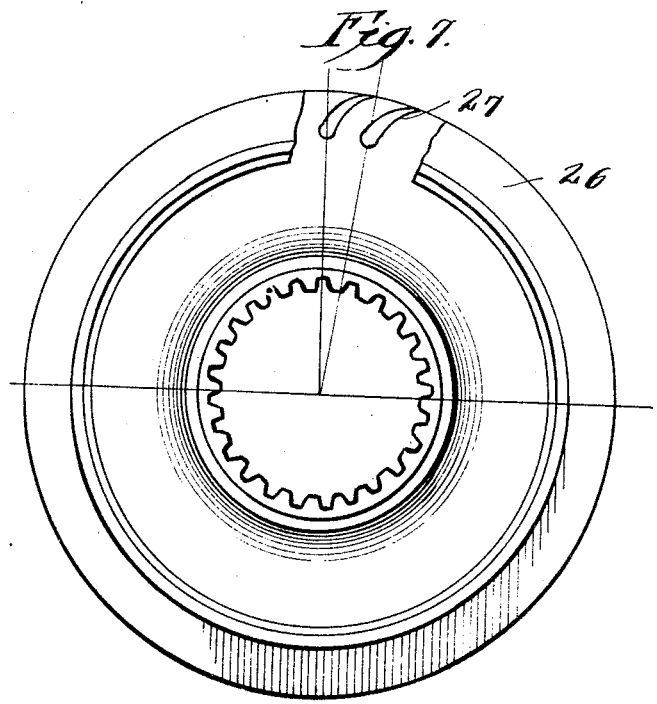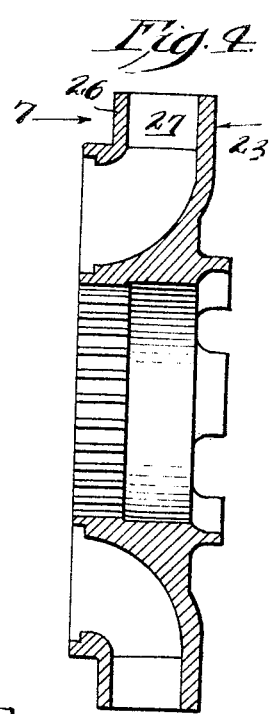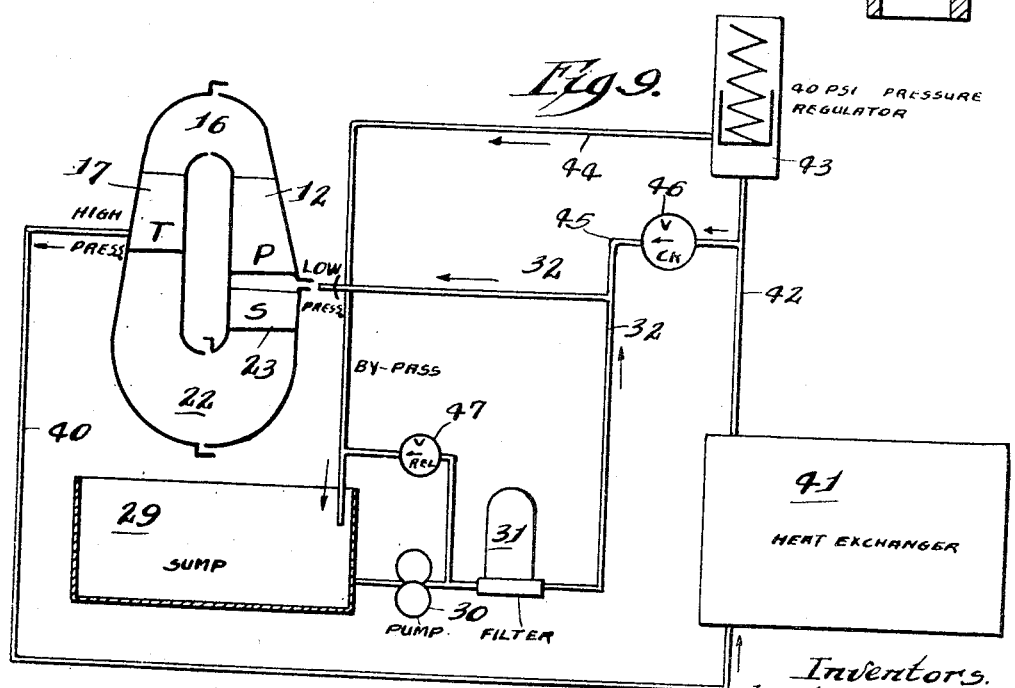

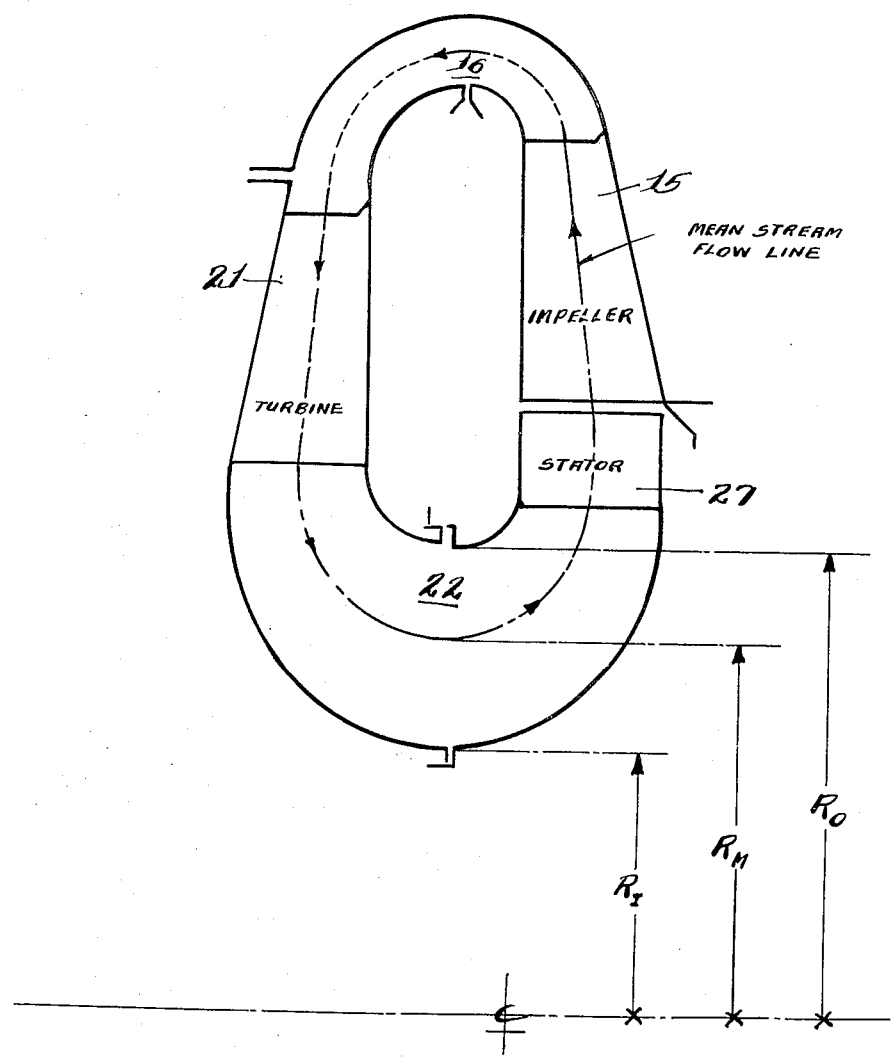

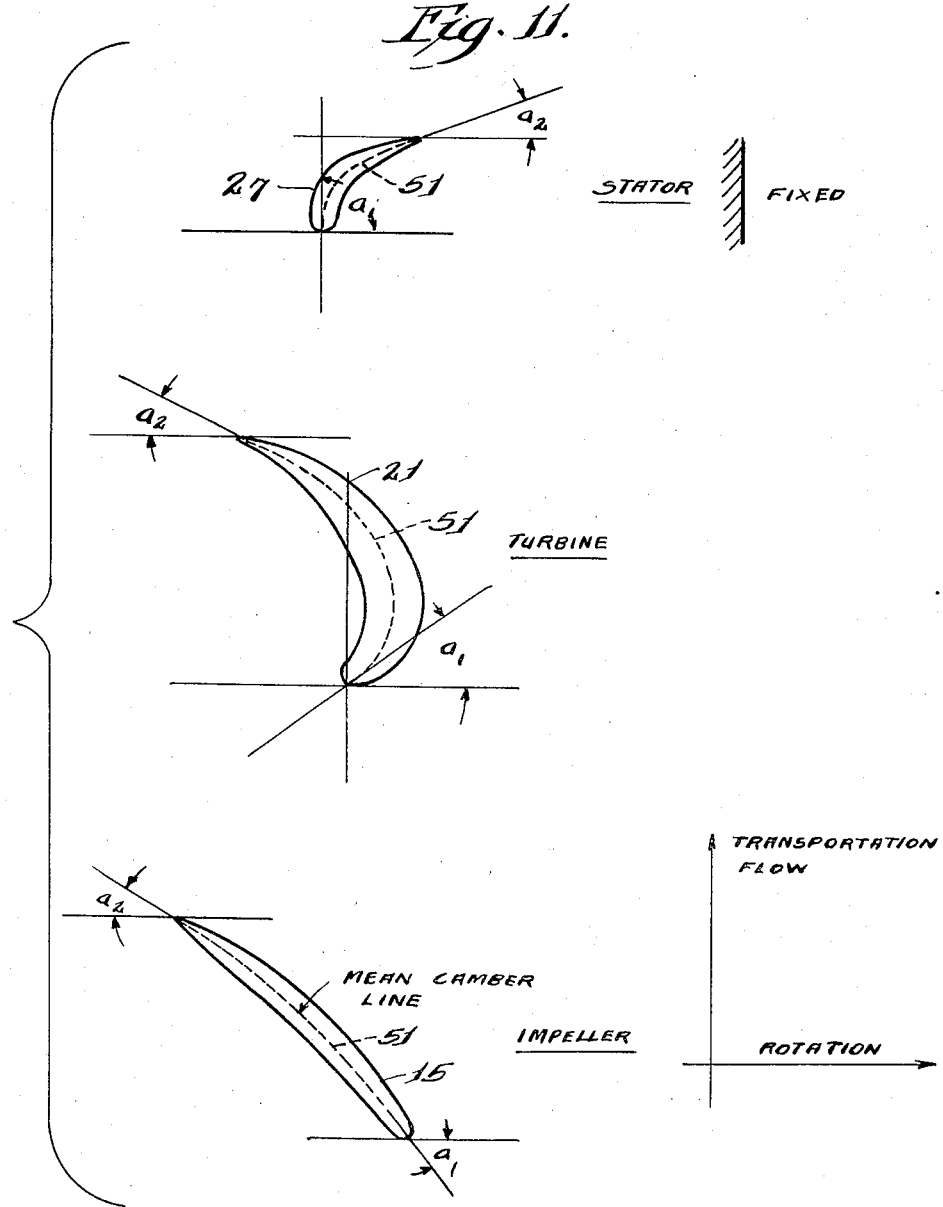

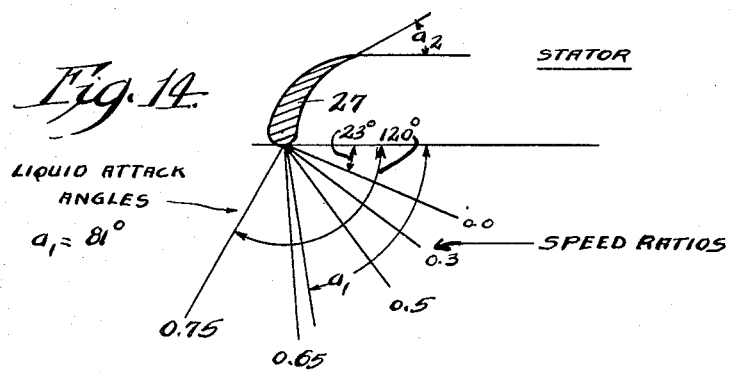
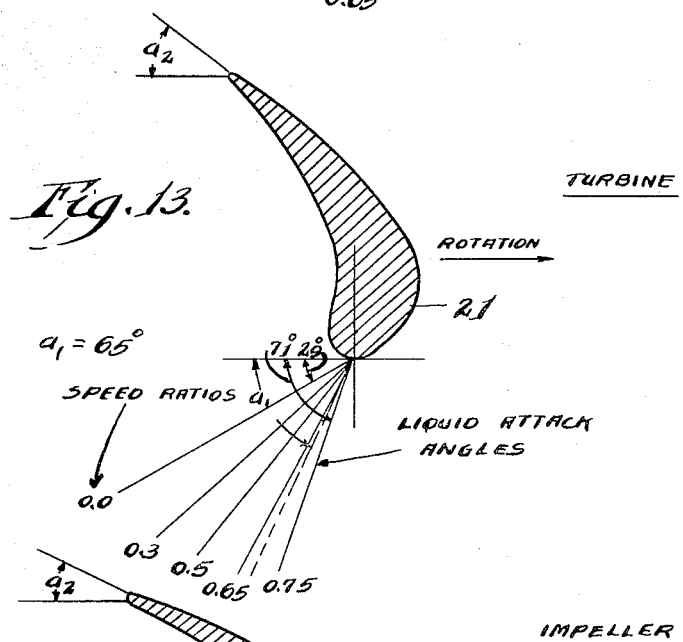
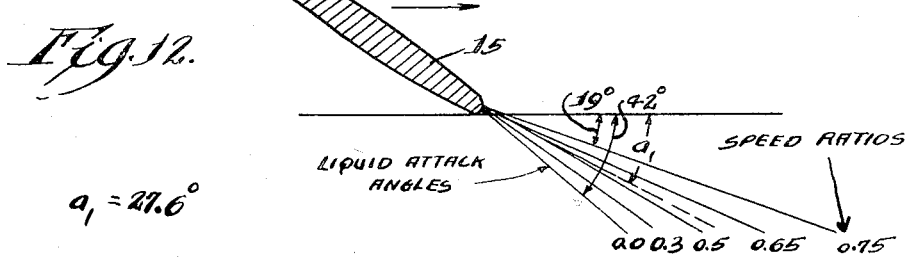

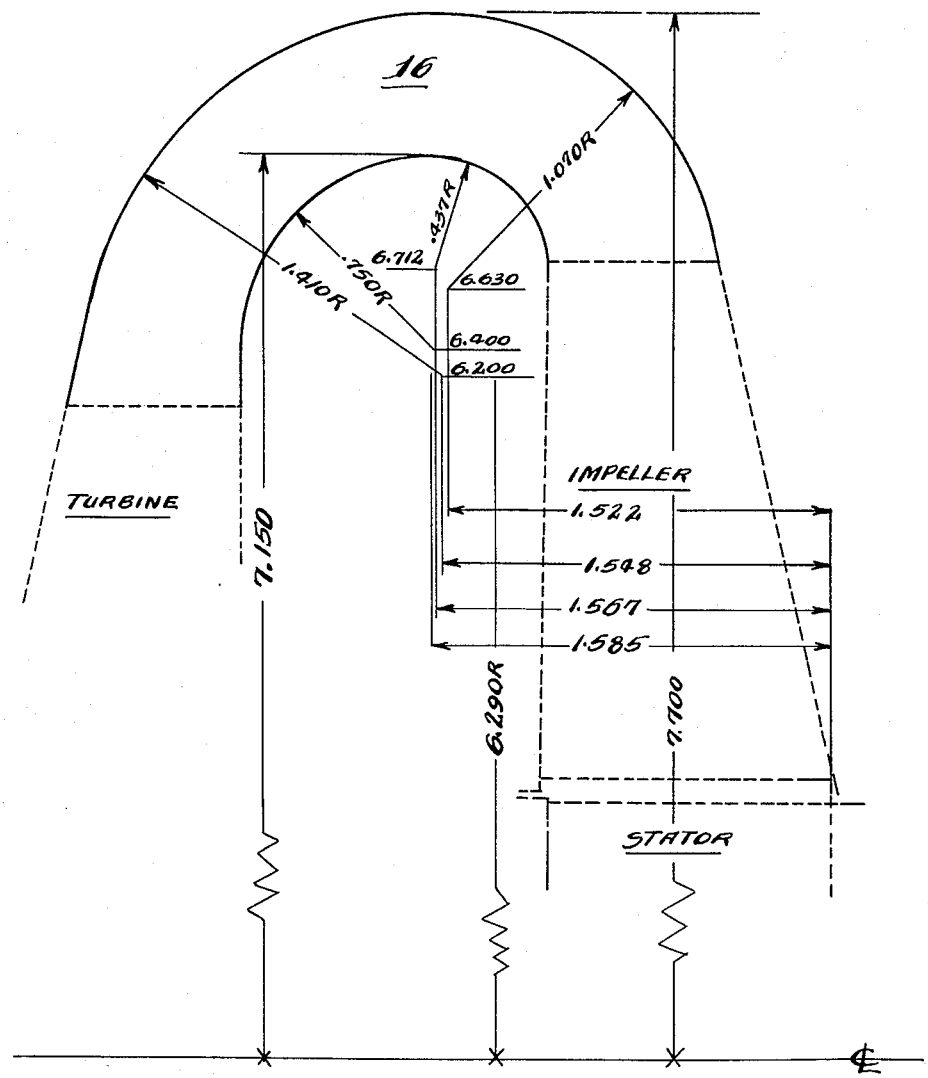

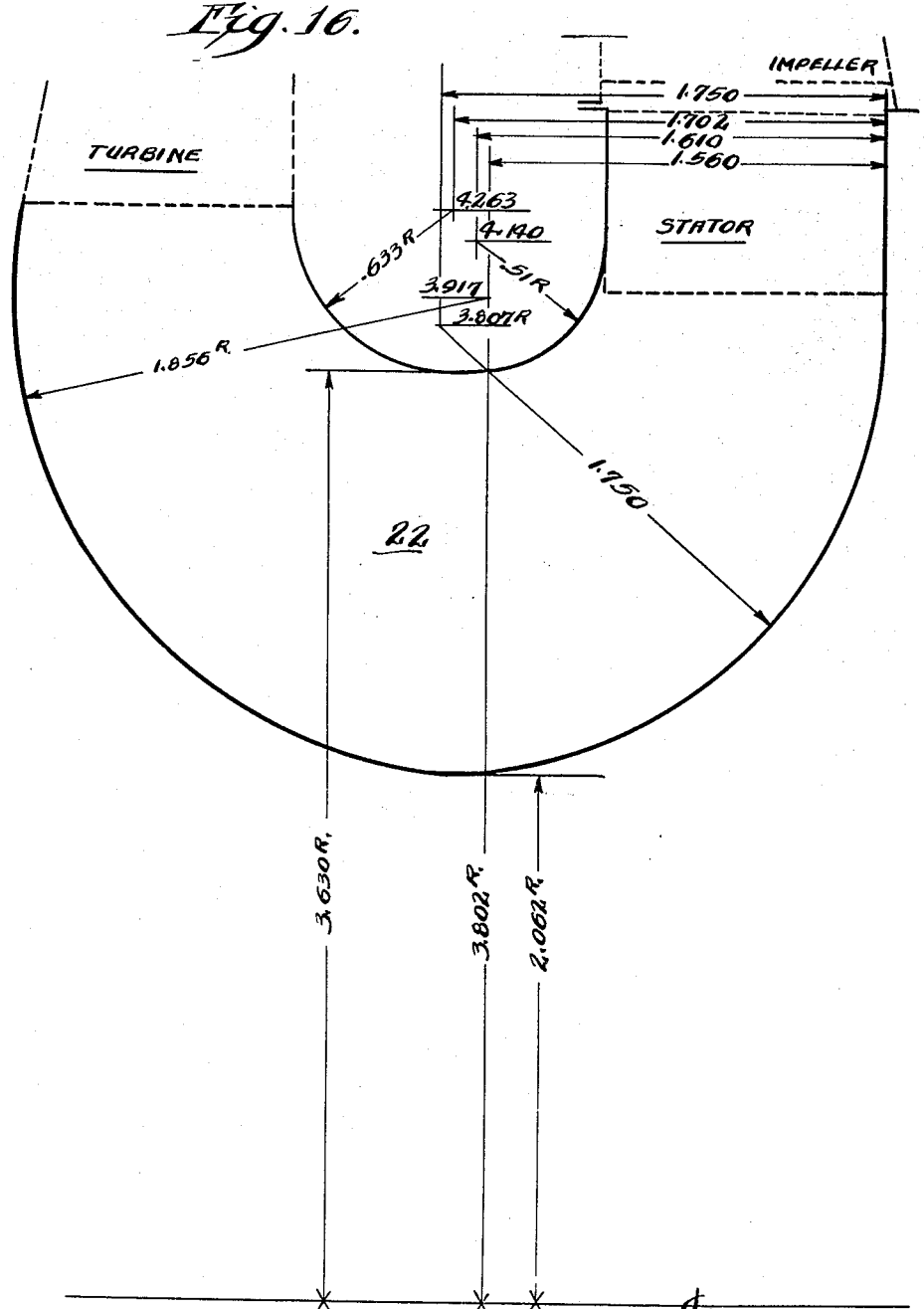

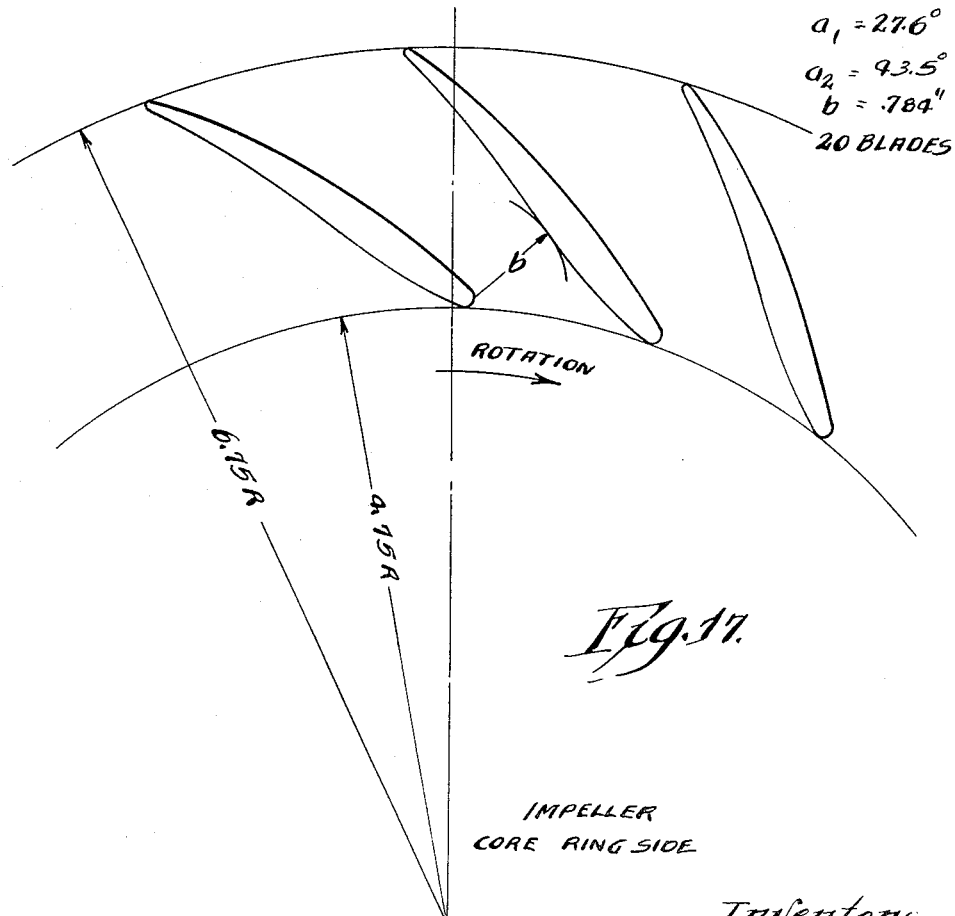

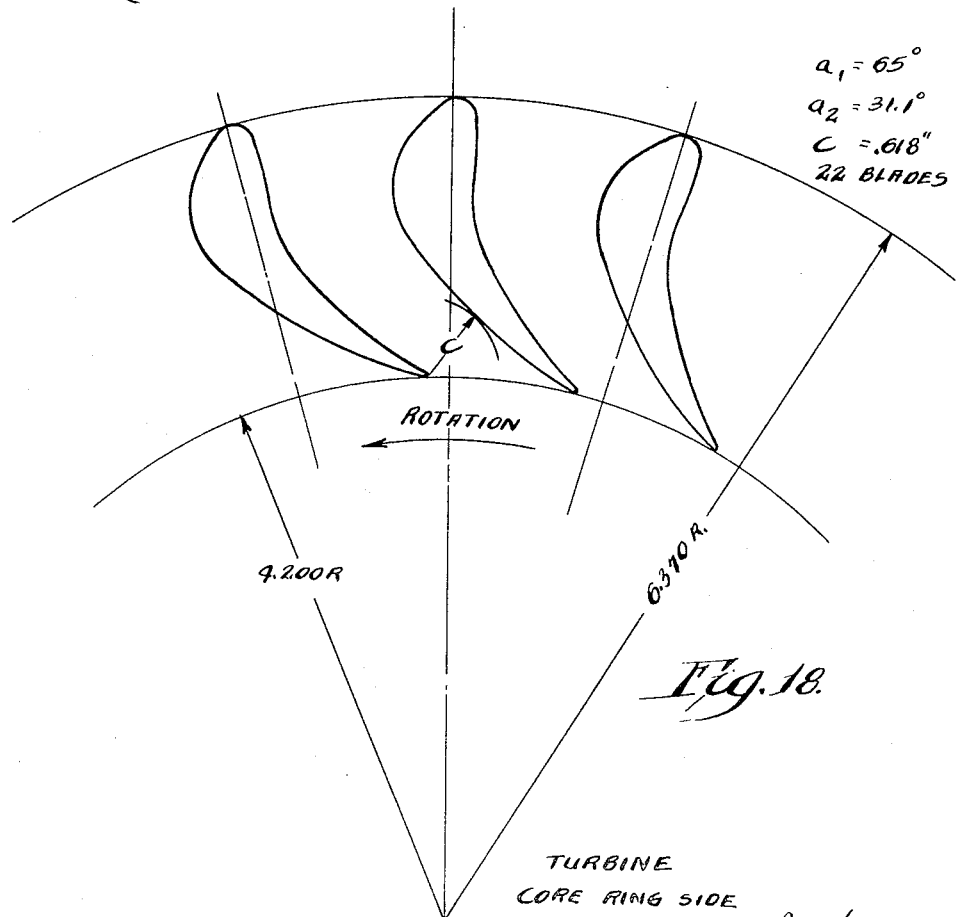

Nov. 29, 1960
M. W. DUNDORE ET AL
HYDRAULIC TORQUE CONVERTER
2,961,830
Filed Jan. 7, 1957
19 Sheets-Sheet 11
Fig. 22.
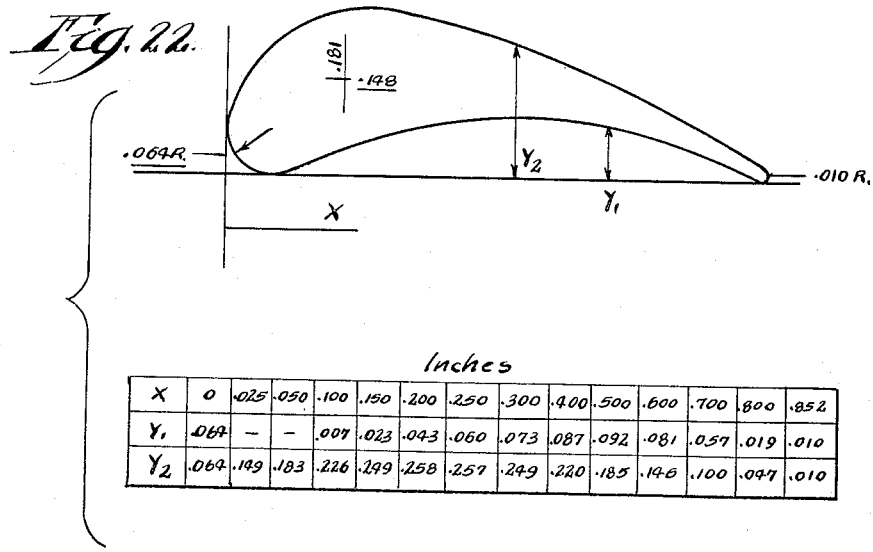
Inches
| X | 0 | .025 | .050 | .100 | .150 | .200 | .250 | .300 | .400 | .500 | .600 | .700 | .800 | .852 |
|---|---|------|------|------|------|------|------|------|------|------|------|------|------|------|
| $Y_1$ | .064 | — | — | .007 | .023 | .043 | .060 | .073 | .087 | .092 | .081 | .057 | .019 | .010 |
| $Y_2$ | .064 | .149 | .183 | .226 | .299 | .258 | .257 | .249 | .220 | .185 | .146 | .100 | .047 | .010 |
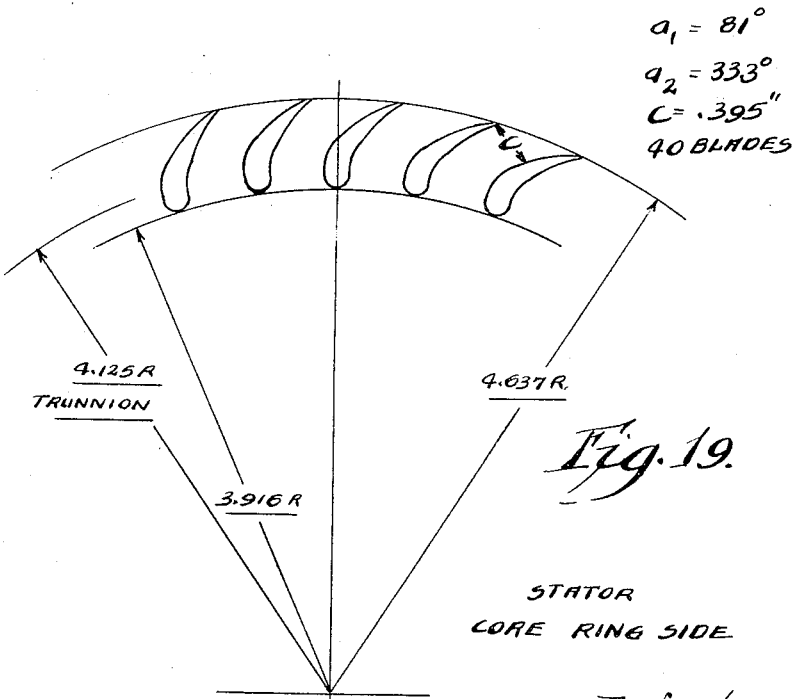
$a_1 = 81°$
$a_2 = 333°$
$C = .395"$
40 BLADES
Fig. 19.
STATOR
CORE RING SIDE
Inventors.
Marvin W. Dundore.
Raymond C. Schneider.
By John W. Darley
Attorney.

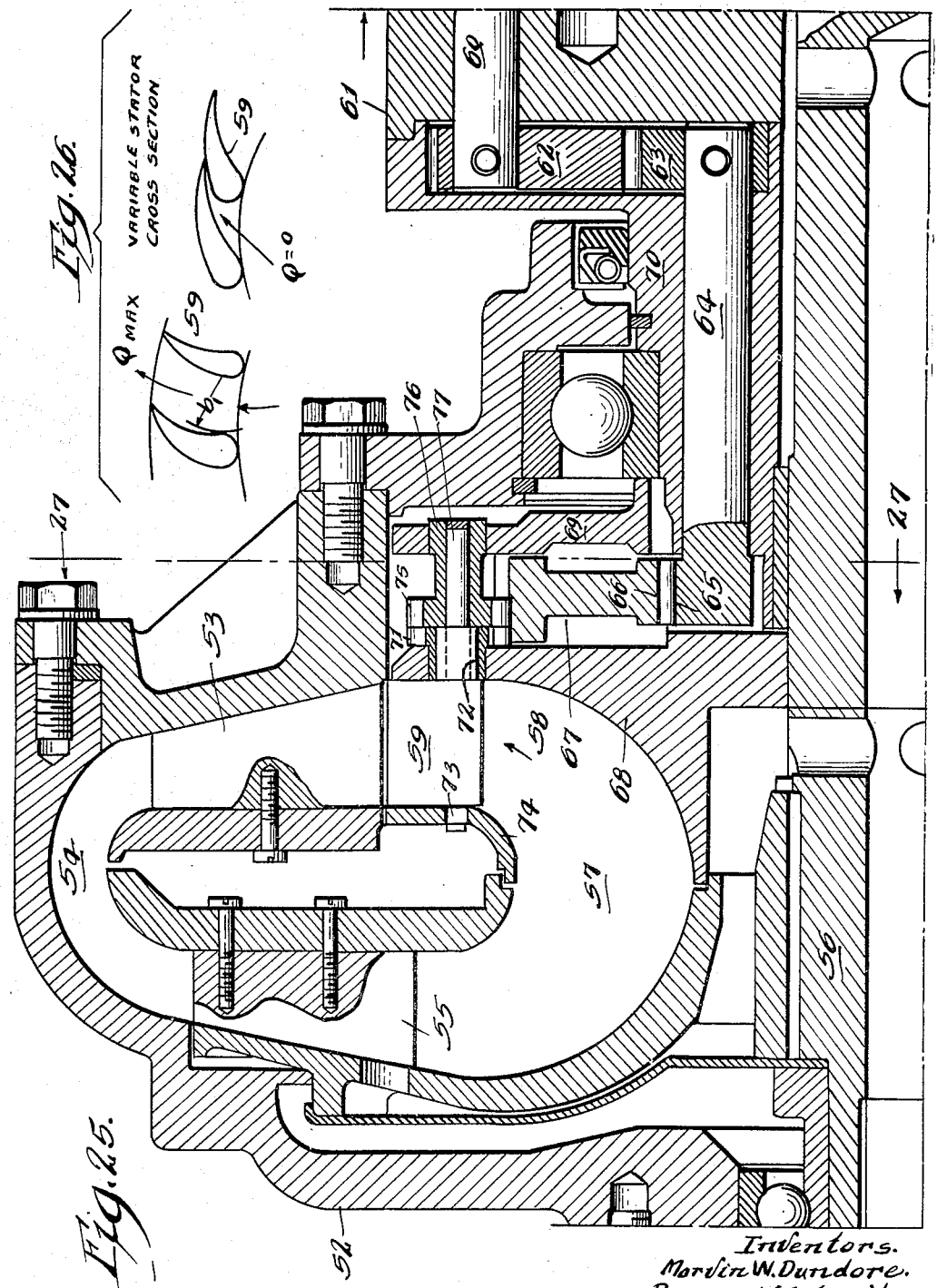

Nov. 29, 1960 M. W. DUNDORE ET AL 2,961,830
HYDRAULIC TORQUE CONVERTER
Filed Jan. 7, 1957 19 Sheets-Sheet 14
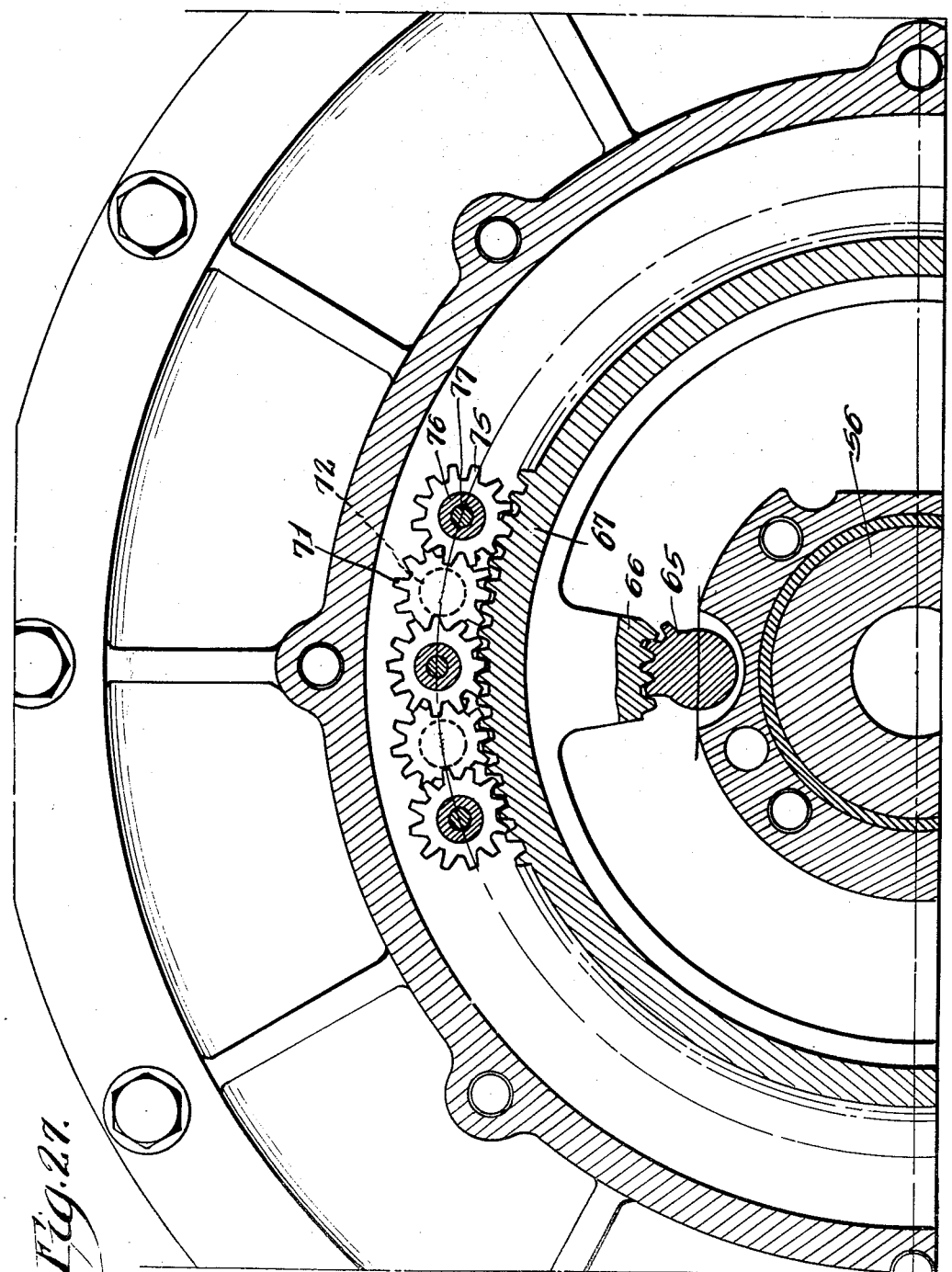

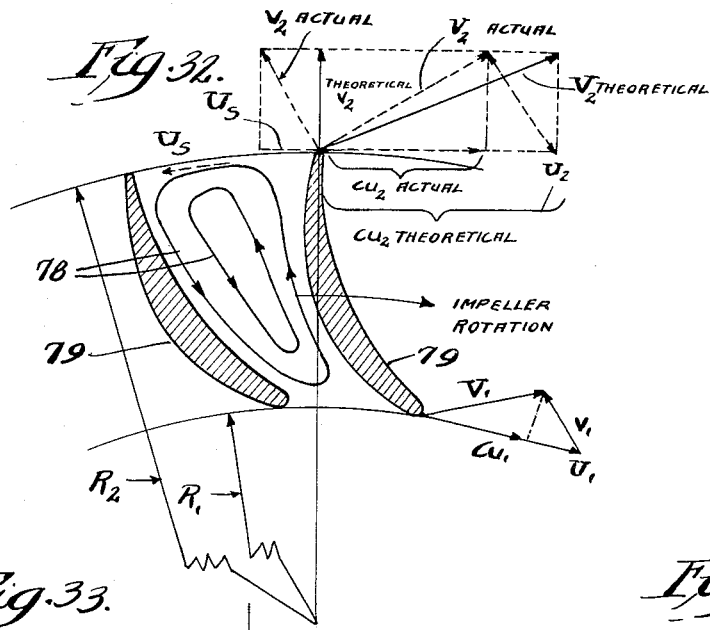
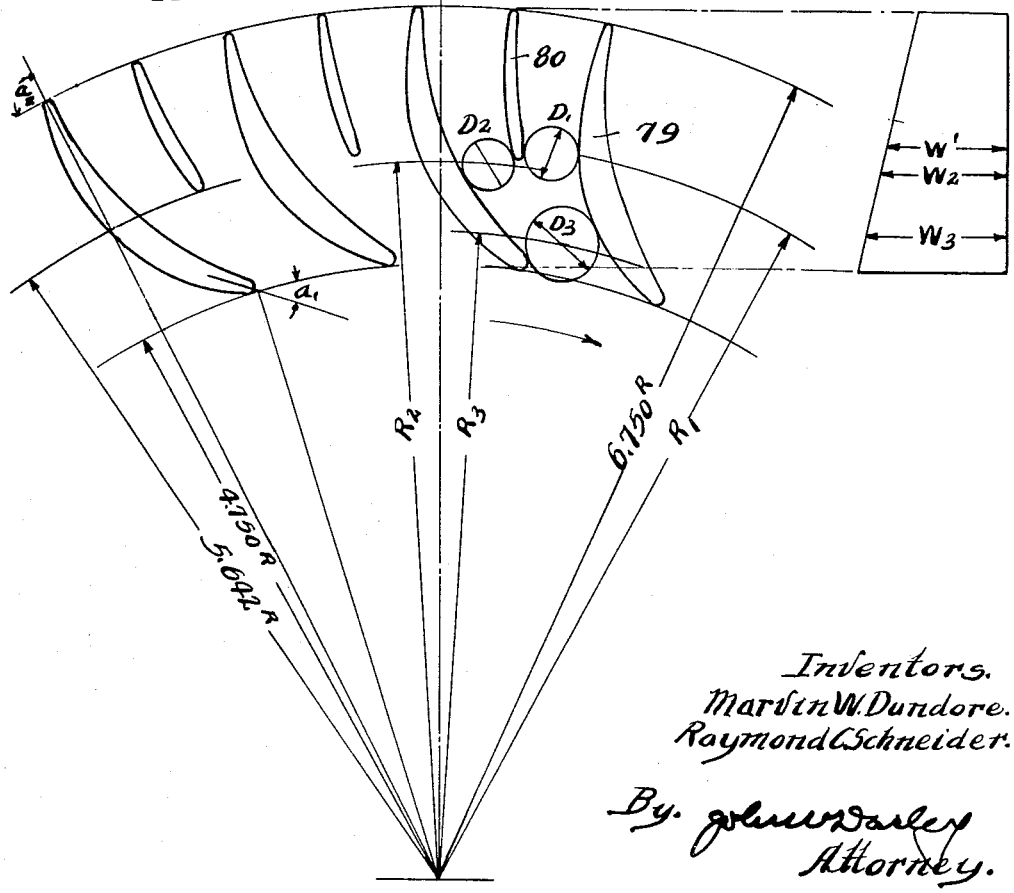

PRINCIPAL BLADE

Inches

| X | 0 | .250 | .500 | .750 | 1.000 | 1.250 | 1.500 | 1.750 | 2.000 | 2.245 |
|---|---|------|------|------|-------|-------|-------|-------|-------|-------|
| Y₁ | .047 | .050 | .114 | .162 | .197 | .214 | .208 | .162 | .080 | .032 |
| Y₂ | .047 | .223 | .346 | .430 | .467 | .454 | .397 | .295 | .178 | .032 |

INTERMEDIATE BLADE

Inches

| X | 0 | .200 | .400 | .600 | .805 | 1.122 |
|---|---|------|------|------|------|-------|
| Y₁ | .028 | .017 | .033 | .033 | .022 | .028 |
| Y₂ | .028 | .114 | .141 | .138 | .118 | .028 |

Inventors.
Marvin W. Dundore.
Raymond C. Schneider.
By John W Darley
Attorney.

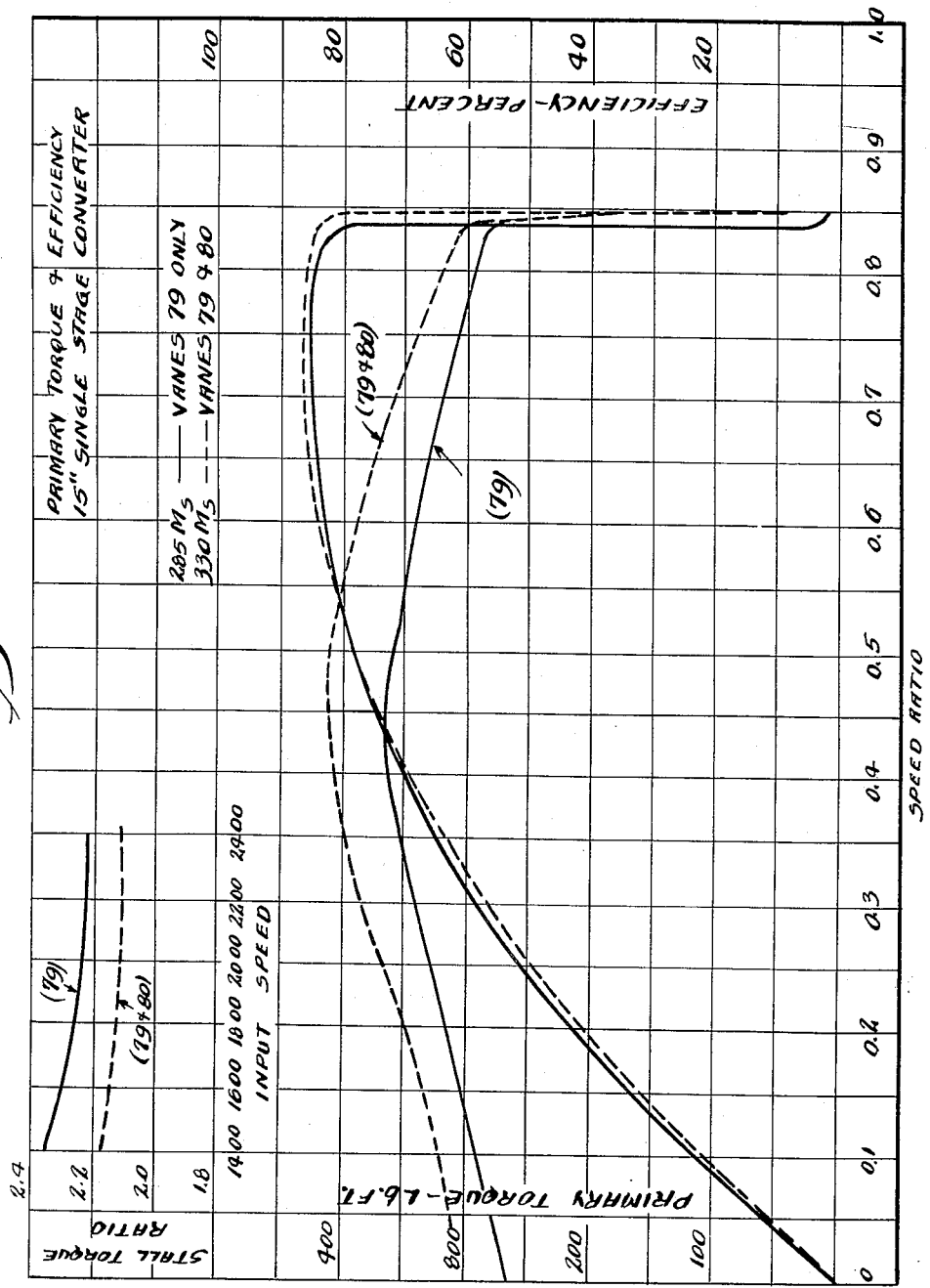

United States Patent Office 2,961,830
Patented Nov. 29, 1960

2,961,830

HYDRAULIC TORQUE CONVERTER

Marvin W. Dundore and Raymond C. Schneider, Rockford, Ill., assignors to Twin Disc Clutch Company, Racine, Wis., a corporation of Wisconsin Filed Jan. 7, 1957, Ser. No. 632,688

7 Claims. (Cl. 60—54)

Our invention relates to a hydraulic torque converter of the single stage, rotating housing type which is characterized by an improved design.

One object of the invention is to provide a hydraulic torque converter of the single stage, single phase type which is more particularly designed for industrial equipment such as, for example, power shovels, hoists, draglines, end loaders, and wheeled and tracked vehicles.

A further object is the provision of a converter of the type indicated which is characterized by a relatively flat, primary torque curve and holds the power source, engine or motor, at or near the governed speed as the speed of the output shaft varies from racing to stall or zero speed, thus permitting the use of the maximum possible horsepower at all times.

A further object is to provide a converter as above which embodies a novel shape of toroidal circuit that, in conjunction with positionings of the impeller and turbine blades, enables the liquid head of the turbine to oppose that of the impeller at relatively high speed ratios, thereby effecting a sudden shut off of flow in the circuit and a substantial reduction in the transmitted torque.

A further object is to devise a converter as above and a connected cooler through which a basic, forced circulation is maintained at all times which is reinforced by the natural circulation in the converter circuit at relatively low speed ratios when maximum heat dissipation is required.

A further object is to devise a converter of the type set forth in which the stator blades are adjustaby rotatable to accurately control the amount and direction of the liquid flow therebetween, thereby uniformly varying the torque absorption and transmission capacity of the unit and enabling the available horsepower to be divided as desired between the shaft connected to the converter and auxiliary equipment connectible to the power source.

A further object is to provide an hydraulic torque converter having a blade system so designed that several combinations of impeller and turbine blades related to a common stator in the same unit will produce variations in torque capacity at a given speed of 2:1.

A further object is to provide a single stage, rotating housing type of hydraulic torque converter which includes an impeller having principal blades radial curved forwardly in the direction of rotation and relatively shorter blades interposed between each pair of adjacent, principal blades to reduce the secondary flow between the principal blades and provide a larger torque capacity for any given principal blade shape and outlet angle.

These and further objects of the invention will be set forth in the following specification, reference being had to the accompanying drawings, and the novel means by which the objects are effectuated will be definitely pointed out in the claims.

In the drawings:

Figs. 2, 3 and 4 are sectional elevations to reduced scale of the impeller, turbine and stator, respectively, all as shown in Fig. 1.

Figs. 5, 6 and 7 are side elevations as viewed, respectively, in the directions of the correspondingly numbered arrows in Figs. 2, 3 and 4, parts being broken away to show a number of blades in each instance.

Fig. 8 is an enlarged, schematic and fragmentary view of the turbine as viewed in Fig. 6 showing the limiting positions of the apertures through which the cooling flow is tapped from the toroidal circuit.

Fig. 9 is a schematic view of the external cooling circuit for the converter shown in Fig. 1.

Fig. 10 is a schematic illustration of the converter shown in Fig. 1 showing the shape of the toroidal circuit, the relation of the component bladed members, and the position of the mean stream flow line of the circuit.

Fig. 11 is an exploded and developed, schematic view showing the relationship and mean stream flow line shapes of the impeller, turbine and stator blades in the Fig. 1 converter and also the Fig. 25 converter when the stator blades thereof are fully open.

Figs. 12, 13 and 14 show vectorially the direction of the relative approach velocities of the working liquid in relation to the inlet tips of the impeller, turbine and stator blades, respectively.

Figs. 15 and 16 are schematic, dimensioned views of the outer and inner, unbladed bends of the toroidal circuit.

Figs. 17, 18 and 19 are enlarged, schematic views of several impeller core blades when viewed from the impeller ring side or in the direction of the arrow 5 in Fig. 2, of several turbine core blades when viewed from the turbine ring side or oppositely to the arrow 6 in Fig. 3, and of several stator blades when viewed from the stator core ring side or in the direction of the arrow 7 in Fig. 4, all respectively, each with suggested inlet and outlet angles ($a_1$ and $a_2$), a suggested distance ($b$) between the impeller blades at their inlet, and a suggested distance ($c$) between the turbine and stator blades, respectively, at their outlets.

Figs. 20, 21 and 22 are dimensioned views of typical impeller, turbine and stator blades, respectively, the dimensions being tabulated with reference to X- and Y-axes and each blade being considered as lying along the X-axis, these views being related to the comparable blades shown in Figs. 17, 18 and 19, respectively.

Figure 23:
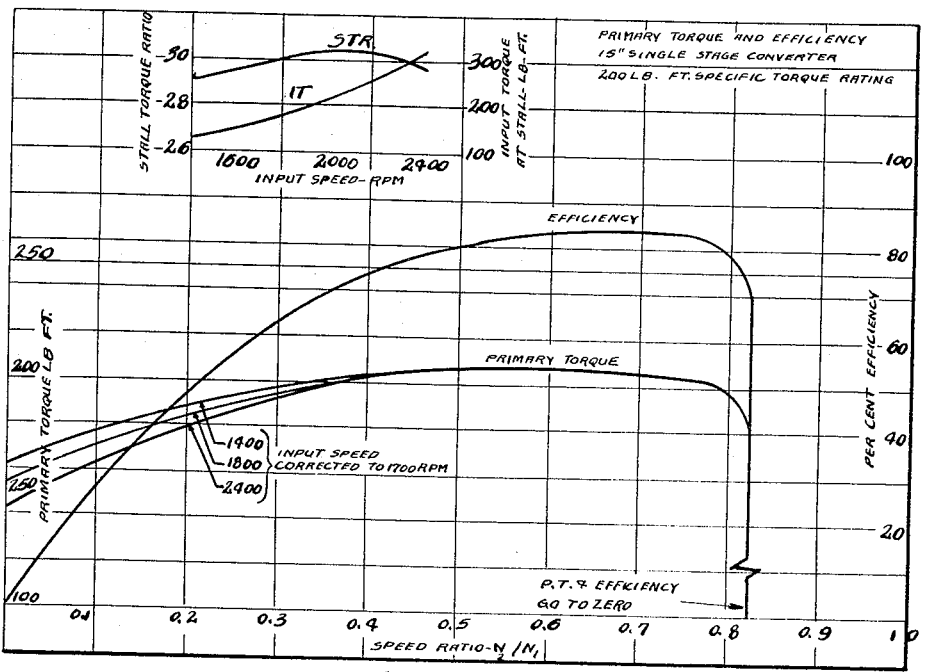

Fig. 23 shows typical performance curves of a 15" hydraulic torque converter embodying the invention and having a specific torque rating of 200 pds. ft.

Figure 24:
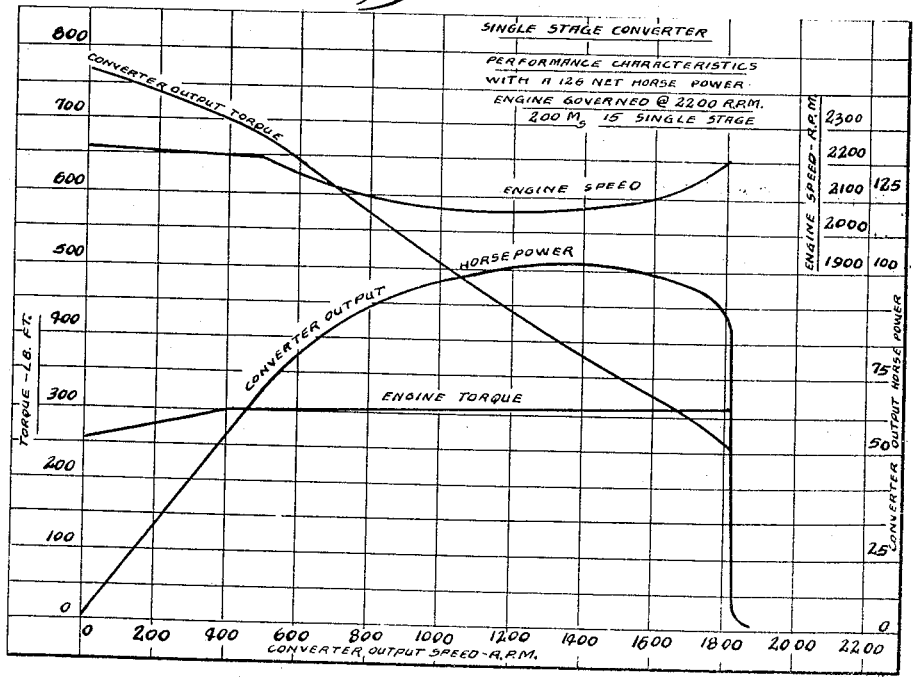

Fig. 24 shows further performance curves of the torque converter referred to in Fig. 23 when matched to a diesel engine having 126 net horsepower output at 2200 r.p.m., and embodying the blading shown in Figs. 17 to 22, inclusive.

Fig. 25 is a fragmentary, longitudinal section of a modification of the converter in which the stator blades are adjustably mounted for variable control on the amount and direction of liquid flow in the torus circuit.

Fig. 26 is a schematic view showing fully opened and closed positions of two adjacent, stator blades in Fig. 25.

Fig. 27 is a section along the line 27—27 in Fig. 25.

Figure 28:
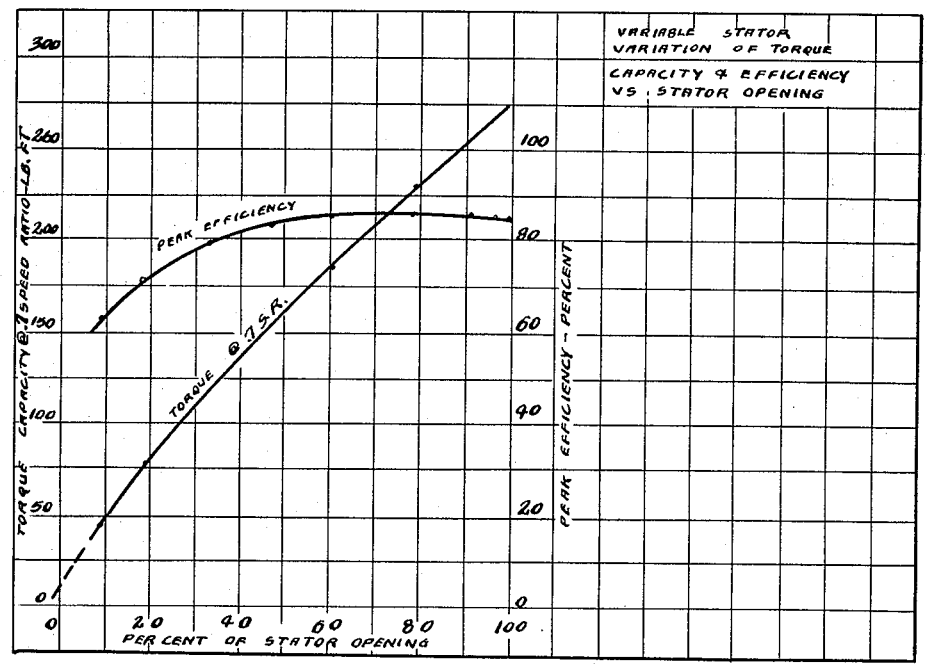

Fig. 28 shows characteristic efficiency and torque curves in relation to variations in the stator blade positions for a typical converter of the Fig. 25 type.

Figure 29:
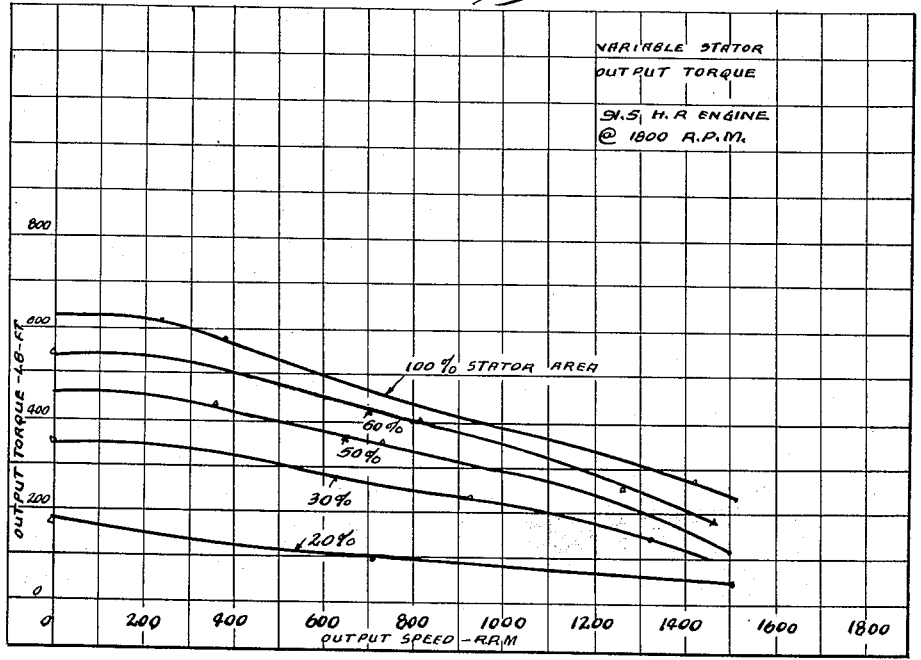
Figure 30:
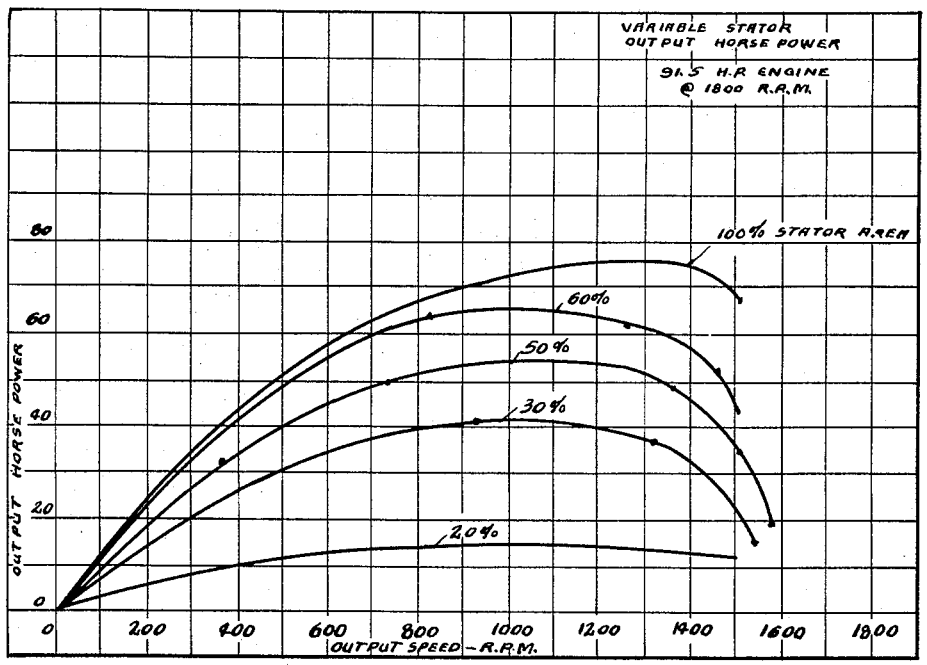
Figure 31:
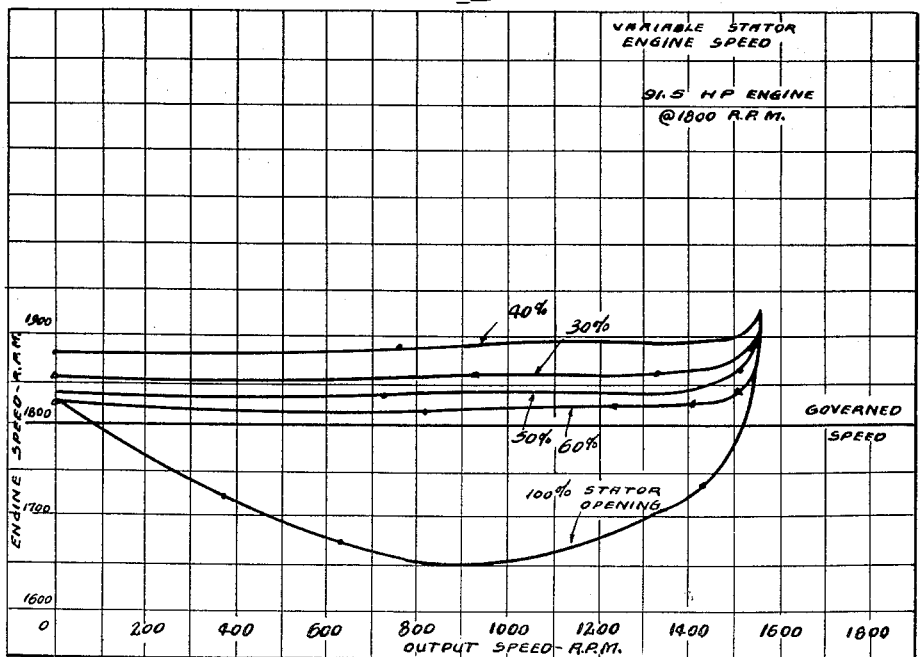

Figs. 29 to 31, inclusive, are performance curves of a typical Fig. 25 converter when connected to an engine providing 91.5 hp. at 1800 r.p.m. and showing, respectively, how the output torque, output horsepower and engine speed vary with the percent of stator blade opening.

Fig. 32 schematically and vectorially shows the effect on impeller torque of the secondary liquid flow between the impeller blades.

Fig. 33 is a schematic, fragmentary view of a modified impeller showing the use of relatively small blades alternately related to the principal blades as a means of reducing the secondary flow effect shown in Fig. 32.

Fig. 34 is a schematic, transverse profile of one impeller flow channel as it appears ni Fig. 33.

Figure 35:
Figure 36:
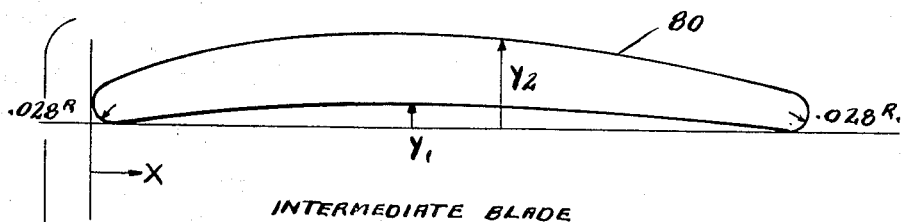

Figs. 35 and 36 are dimensioned views of typical, principal and intermediate blades for the Fig. 33 impeller, the dimensions being tabulated with reference to X- and Y-axes and each blade being considered as lying along the X-axis, the intermediate blade being shown to an enlarged scale.

Fig. 37 indicates performance curves showing by way of comparison the difference in unit capacity between a typical converter equipped with and without the intermediate blades.

Figure 1:
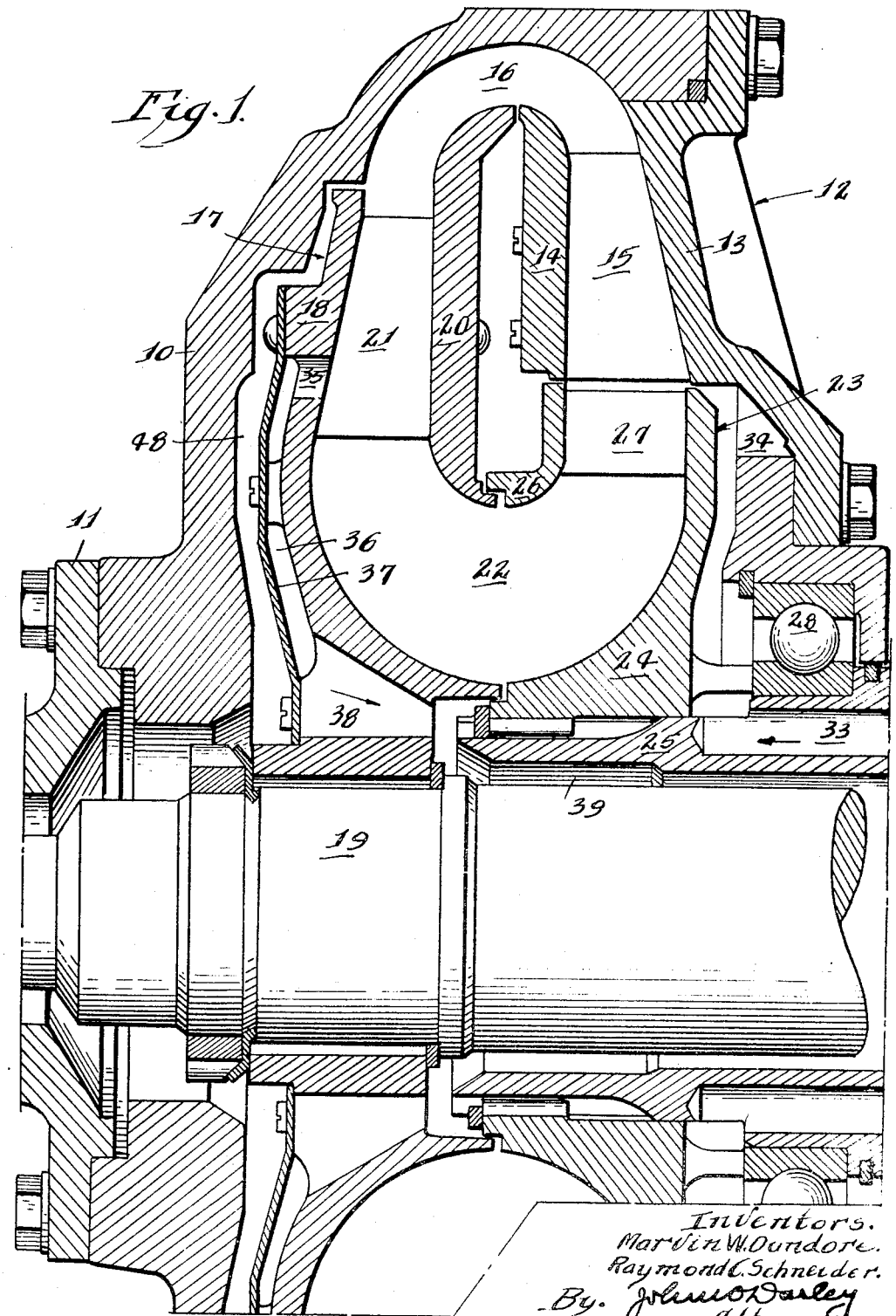
Fig. 1 is a fragmentary, longitudinal elevation in section of one form of the hydraulic torque converter.

Referring to Fig. 1, the numeral 10 designates the rotating housing of the converter which has its opposite ends respectively attached to an annular connector 11 providing a driven connection between a source of power and the impeller 12 which includes an end ring 13, a core ring 14 spaced therefrom, and a plurality of blades 15 equispaced around the end ring 13 and core ring 14 and bridged therebetween.

The discharge from the impeller 12 enters one end of a reversely curved, unbladed, outer pasage 16 whose opposite end connects with the inlet of a turbine 17 which includes an end ring 18 having splined connection with a load shaft 19, a core ring 20 spaced from the end ring 18, and a plurality of blades 21 equispaced around the end ring 18, and a plurality of blades 21 equispaced around the end ring 18 and core ring 20 and bridged therebetween.

The discharge from the turbine 17 enters one end of a reversely curved, unbladed, inner passage 22 whose opposite end connects with the inlet of a stator 23 which includes an end ring 24 which is splined to a stationary sleeve 25 coaxial with and spaced from the shaft 19, a core ring 26, and a plurality of blades 27 equispaced around the end ring 24 and core ring 26 and bridged therebetween. The delivery of the stator 23 is closely adjacent the inlet of the impeller 12 and the latter is piloted on a bearing 28 carried by the sleeve 25.

As shown in Fig. 1, the impeller 12, passage 16, turbine 17, passage 22 and stator 23 are related to provide a closed, toroidal path for the working liquid, except that, as presently described, the liquid also flows through an outside and connected cooler. Generally speaking, the impeller blades 15 and the stator blades 27 occupy positions in the radial outward flow part of the toroidal circuit, while the turbine blades 21 are positioned in the radial flow part of this circuit. The impeller blades 15, turbine blades 21 and stator blades 27 are normally related to the end and core rings 13 and 14, 18 and 20, and 23 and 26, all respectively.

The shape of the toroidal circuit in relation to the locations of the several blades is an important phase of the invention and its advantages will be subsequently discussed in the development of the operative characteristics of the converter. For the present, it will be noted that the blade contacting faces of the core rings 14 and 26 are coplanar and transverse to the axis of the converter, and that the like face of the core ring 20 is also transverse to the same axis. Further, the end ring 13 along the impeller blades 15 is convergingly related to the core ring 14, while the end ring 18 is divergingly related to the core ring 20, both in the direction of liquid flow.

The passages 16 and 22 are generally U-shaped or substantially semi-circular and hence effect a 180° change in direction of the liquid flow between the impeller 12 and turbine 17, and this turbine and the stator 23, respectively. Further, these passages are arranged to provide easy and nonturbulent direction changes in the liquid flowing therethrough to thereby prevent separation of the liquid from the walls of the passages. The requirements for effecting these results will be subsequently discussed.

An important feature of the invention is the manner of dissipating a substantial part of the heat developed in the working liquid while moving through the converter passages by flowing this liquid through an external cooler under a specified control. It is the usual practice in the rotating housing type of single stage converter to force a cooling flow through the converter and cooler by means of an engine driven pump having a capacity of 20 to 30 gallons per minute for the converter size contemplated herein. Since the converter efficiency decreases from a maximum at relatively high speed ratios to zero at stall (see Fig. 23 for the converter disclosed herein), speed ratio being defined as the speed of the turbine divided by that of the impeller, it will be apparent that the cooling pump under present practice must not only be large enough to insure heat dissipation in the cooler at low speed ratios when the heat load is a maximum, but it also pumps the same amount during peak efficiency operation when the necessity for heat rejection is at a minimum. This arrangement requires a substantially larger and more expensive pump than that employed in acocrdance with the improved cooling system.

A substantial reduction in pump size to one having a capacity of about 5 gallons per minute is obtained by the cooling scheme of the present invention which envisages a basic forced circulation at all times through the system including the converter and cooler, this basic circulation being derived from the pump. This flow is reinforced during operation at low speed ratios (maximum heat load) by the natural flow in the toroidal circuit set up by the impeller.

A schematic representation of the cooling circuit is shown in Fig. 9 to which reference will now be made. The working liquid is withdrawn from a convenient sump 29 by an engine driven pump 30 and flows through a filter 31 and a pipe 32 for delivery to the toroidal circuit of the converter between the outlet tips of the stator blades 27 and the inlet tips of the impeller blades 15 which is the lowest pressure zone in the toroidal circuit. Specifically, and referring to Fig. 1, the pipe 32 delivers the liquid to a passage 33 in the sleeve 25 from which the liquid flows radially outward through an annular space 34 between the end rings 13 and 24 to the stated low pressure zone.

Still referring to Fig. 1 and also to Fig. 6, the working liquid is tapped from the toroidal circuit by means of an annular set of apertures 35 provided in the end ring 18, each aperture communicating with a channel between a pair of adjacent turbine blades 21. Certain qualifications are placed on the number and locations of the apertures 35 with respect to the outlet tips of the turbine blades 21 as will be presently developed.

From the apertures 35, the tapped liquid flows radially inward through an annular channel 36 included between the turbine end ring 18 and a shield ring 37 spaced from the ring 18 and carried thereby, and thence through a plurality of passages 38 in the hub part of the turbine end ring 18 for delivery to an annular passage 39 included between the output shaft 19 and fixed sleeve 25.

Referring to Fig. 9, the liquid then flows to a pipe 40 whose inlet end (not shown) is conventionally mounted in the sleeve 25 in communication with the passage 39. For convenience, the inlet end of the pipe 40 is shown as connected directly to the turbine 17, but it will be understood that this portion of the indicated pipe includes, as conduit means, the apertures 35, channel 36, and passages 38 and 39.

The opposite end of the pipe 40 connects with a cooler or heat exchanger 41 which in turn connects by a pipe 42 with the inlet of a conventional pressure regulating valve 43 whose outlet connects by a pipe 44 with the sump 29. Bridged between the pipes 32 and 42 is a pipe 45 which includes a check valve 46 that is conditioned to permit flow only from the pipe 42 to the pipe 32. A conventional pressure relief valve 47 is bridged around the pump 30 to provide a relieving connection between the outlet of the pump and the sump return pipe 44.

The pressure regulating valve 43 determines the basic pump pressure in the converter-cooler circuit shown in Fig. 9, a pressure of about 40 p.s.i. having been found suitable. This pressure not only prevents cavitation in the toroidal circuit of the converter and replenishes losses of the working liquid through the conventional seals that are intended to retain the liquid within the converter, but also sets up a sufficient flow in the cooling circuit to dissipate the nominal heat generated when the converter is operating at high speed ratios of the order of 0.7 to 0.8. At relatively low speed ratios when the load is heavy and maximum heat removal is required, advantage is taken of the natural circulation engendered by the impeller 13 which is additive to the basic circulation set up by the pump 30. Accordingly, there is provided an increased flow rate of the working liquid through the cooler 41 precisely when required. During the period of increased flow, the liquid issuing from the cooler 41 divides, part flowing through the regulating valve 43 to the sump 29 and the remainder moving through the check valve 46 for direct return to the converter.

Referring again to Fig. 1, the securing of an adequate, natural cooling flow in the converter at low speed ratios including stall ratio is tied in with the apertures 35 and shield ring 37 which isolates the liquid moving through the annular passage 36 from that included in the annular space 48 between the rotating housing 10 and the shield ring 37. This isolation insures that the liquid in the space 36 is not subject to the pressure head on the liquid in the space 48 set up by skin friction with the rotating housing 10 which would be in a direction opposing the cooling flow.

It has been determined (see Fig. 8) that the size of each aperture 35 can be such that it will fit between any pair of adjacent turbine blades 21 and that the total number of apertures must not exceed about 35% of the number of flow channels in the turbine. For a turbine having twenty-two blades, by way of example, the number of apertures would therefore be eight. A further limitation affecting the position of each aperture 35 is that it shall not be closer to the imaginary circle that touches the outlet tips of the turbine blades 21 than as schematically shown in Fig. 8, the position being related to the diameter of the aperture 35 which is located midway of the pressure or trailing and leading faces of the adjacent blades 21, respectively. For example, if the diameter of the aperture 35 is "D," a radius 49 is drawn from the outlet tip of one blade 21 to the nearest point on the leading face of the next blade and the center of the aperture 35 will then lie on a line 50 parallel to the indicated radius and at a distance of 1.0D to 1.5D therefrom and midway of the blades in question. In converters of the specific sizes presently referred to, the diameter of the apertures 35 may range from $^{11}/_{32}''$ to $\frac{1}{2}''$.

In a particular converter, the circulation in the toroidal circuit was 2240 gallons per minute while the cooling flow throught the apertures 35 was 23 gallons per minute, both at stall ratio. As the converter efficiency increased, the total circulation dropped to 1350 gallons per minute and the cooling flow to 3 gallons per minute, both at 0.75 speed ratio. At the latter point and due to the increased speed of the turbine 17, the rotational head on the liquid in the annular passage 36 (see Fig. 1) fully opposes whatever natural circulation then exists in the toroidal circuit and as long as the operation of the converter is characterized by this relatively high speed ratio or one higher, cooling flow is maintained solely by the pump 30 (see Fig. 9). This opposing flow situation will be more fully developed hereinafter.

The operating characteristics of the Fig. 1 converter are related to the shape of the toroidal circuit as schematically shown in Fig. 10, the respective shapes, inlet and outlet angles of the impeller, turbine and stator blades, and the number of blades in each blade group. The considerations subsequently discussed, including the blade inlet and outlet angles, liquid attack angles and radii are with reference to the mean stream flow line of the toroidal circuit and respective blades as indicated in Fig. 10. The location of the mean stream flow line at any given point in the flow path is determined by the following formula as graphically indicated for the inner curved and unbladed passage 22 in Fig. 10:

$$R_m = \sqrt{\frac{R_i^2 + R_o^2}{2}}$$

wherein
$R_m$ = Mean radius of a point on the mean stream flow line
$R_i$ and $R_o$ = Inner and outer radius, respectively, of points on the end of a line substantially perpendicular to the torus walls through the point on the mean stream flow line.

A converter embodying the inventive features disclosed herein is characteristically employed with a governed, internal combustion engine and, by way of example, this engine will be considered as of the diesel type. Design requirements are based on the relation between the characteristic torque and horsepower curves of a given engine and the characteristic primary torque curve of a converter for such an engine. The primary torque of a converter is defined as that which is required to turn the impeller at any given speed as the speed of the turbine varies from stall (0.0) to racing (1.0).

In the present instance, the converter has a relatively flat, primary torque curve (see Fig. 23) so that the engine is held at or near the governed speed as the speed of the output shaft varies from racing to stall or zero speed. Since most engine horsepower curves rise with an increase in engine speed to a maximum at the governed speed, the present converter enables the use of the greatest possible horsepower at all times. While as indicated in Fig. 23, the primary torque falls slightly at low speed ratios, i.e., approaching a condition of stall, with an accompanying reduction in the horsepower absorption capacity of the converter, more horsepower becomes available during this range for operating accessory equipment.

Referring to Fig. 11, there is shown in exploded and developed relation characteristic shapes of the blades in the several stages of the converter and along their mean stream flow lines. The inlet and outlet angles for each blade are designated as $a_1$ and $a_2$, respectively, and for the impeller blade, the inlet angle is defined as the angle between the tangent to the mean camber line 51 and the tangent to the circle indicated by the radius of rotation of the impeller blade 15 at its inlet tip. The same principle applies to the outlet angle of the impeller blade 15, and to the inlet and outlet angles of the turbine blade 21 and the stator blade 27.

Generally speaking, the blade shapes have been designed to provide efficient liquid flow over a wide range of speed ratios. For this purpose, the blade development has been such as to secure high efficiency at the maximum theoretical design point and to accept flow at a number of attack angles with a minimum of shock loss due to separation of the liquid from the blade surfaces with a resulting reduction in efficiency loss, flow over the blades being smooth. Blade design directly determines the capacity, efficiency and other operational characteristics such as the torque ratio at stall, the shape of the torque curve and the speed ratio at which peak efficiency occurs.

Considering the impeller blade 15 and referring to Fig. 12, its inlet tip is designed to accept liquid from the stator blades 27 over a relatively small angular dispersion of from 19° to 42° as clearly indicated by the approach velocity vectors in Fig. 12 which are related to a speed ratio range of from 0.0 to 0.75 and which may be considered in connection with the primary torque curve shown in Fig. 23. The comparatively narrow dispersion of the approach velocity vectors enables the use of a long, thin impeller blade and it has been ascertained that optimum results are obtained when this blade has an 8 to 12% ratio of thickness to chordal length.

The dispersion of the approach velocity vectors at the inlet tips of the turbine blades 21 and stator blades 27 (see Figs. 13 and 14) occurs over substantially larger angles 29° to 71° for the turbine blades and 23° to 120° for the stator blades, compared to that of the impeller blade, for the same range of speed ratios. Hence, for the most efficient flow, the inlet tips of the turbine and stator blades possess a bulbous shape.

The best performance characteristics for the several blades have been obtained with a range of inlet and outlet angles, $a_1$ and $a_2$, respectively, as set out in the following table:

|  | Inlet Angles, degrees | Outlet Angles, degrees |
| --- | --- | --- |
| Impeller Blades | 25 to 45 | 36 to 90 |
| Turbine Blades | 32 to 65 | 22 to 35 |
| Stator Blades | 77 to 85 | 25 to 35 |

Considering the operating characteristics of the converter and referring to Fig. 1, flow through the impeller 12 and turbine 17 is generally radially outward and inward, respectively, of the conveyor. In other words, the respective impeller and turbine blades 15 and 21 are positioned in the toroidal circuit so that at a speed ratio of from 0.80 to 0.90, the liquid head of the turbine 17 opposes that of the impeller 12 to thereby effect a sudden cessation of flow through the working circuit and a substantial reduction in the transmitted torque. This operation obviates the common necessity with other types of converters for employing an output shaft governor where high output speeds at light loads are dangerous or generally undesirable. Further, the flow shut-off at high speed ratio, light load conditions substantially reduces the heat rejection horsepower factor without requiring a freewheeling of the stator 23.

The blades in the several stages are positioned at right angles to their respective core and end rings as shown in Fig. 1 and are not twisted between their inlet and outlet tips. Further, in the usual type of construction involving a radial outflow impeller and a radial inflow turbine, it is well known that the minimum distance and hence area between a pair of adjacent impeller blades occurs at the inlet between these blades and that this channel area increases towards the blade outlets, whereas the reverse is true for the turbine. Therefore, in this known type of impeller, the relative velocity head of the liquid decreases and its pressure head increases as the liquid flows outwardly between the impeller blades in accordance with the law governing flow of liquid through a conduit. The reverse situation occurs in the known radial inflow turbine, i.e., from inlet to outlet, the relative velocity head increases and the pressure head decreases.

Since it is only kinetic energy imparted to the working liquid by the impeller that has value in exerting a rotational force on the output shaft, it is advantageous to reduce the pressure head development as much as possible. In the present converter, this has been accomplished by contracting the boundary walls of the impeller flow channels from the inlet to the outlet of the impeller 12 and, specifically, by relatively converging the end and core rings 13 and 14, respectively, as shown in Fig. 1. By this arrangement, the increase in each flow channel area in the impeller 12 from the inlet to the outlet thereof may be limited up to about 30% of what it would otherwise be.

In the turbine 17, the boundary walls constituted by the end and core rings 18 and 20, respectively, relatively diverge from the inlet to the outlet and limit the area decrease between the blades 21 up to about 25%.

For the stator 23, the end and core rings 24 and 26, respectively, are parallel in the regions of their abutment to the stator blades 27 and the latter are related to limit the area decrease from their inlet to the outlet to about 20%.

Typical dimensions for the outer and inner, reversely curved and unbladed passages 16 and 22 are shown in Figs. 15 and 16, all respectively, and are to be considered in conjunction with the specimen impeller blades (Figs. 17 and 20), turbine blades (Figs. 19 and 22). For the purpose of preventing separation of the liquid from the walls of the passages 16 and 22 and subsequent energy losses, the transverse area of the outer or high energy passage 16 is preferably reduced 10 to 15% from the outlet of the impeller 12 to the inlet of the turbine 17, while in the inner or low energy passage 22, the comparable area is preferably held constant from the outlet of the turbine 17 to the inlet of the stator 23, or it may be slightly and gradually decreased in the same direction.

From the foregoing and considering the outer and inner, reversely curved passages 16 and 22, respectively, in conjunction with the converging and diverging flow channels in the impeller and turbine 12 and 17, respectively, it is apparent that the outer peripheral profile of the toroidal circuit is substantially pear-shaped.

In Figs. 23 and 24 are shown typical performance curves of the converter, the former indicating the relatively flat primary torque and high efficiency of a 15″ converter in relation to speed ratios, and the latter curves for the same size converter when matched to a specific engine and employing the dimensioned blading shown in Figs. 17 to 22, inclusive. For these sizings, the impeller 13 includes twenty blades whose inlet and outlet tips lie forwardly and rearwardly with respect to the rotation direction of the impeller (see Fig. 17), the turbine 17 has twenty-two blades, and the stator includes forty blades, all blades being equally spaced around their respective members.

Depending on the size of the converter, the number of impeller blades ranges from 16 to 26, those of the turbine from 22 to 30, and those of the stator from 38 to 48, and these blade ranges are tied in with the inlet and outlet angles tabulated above.

A modified form of the Fig. 1 converter is shown in Figs. 25 to 27, inclusive, wherein provision is made for adjustably rotating the stator blades in a manner to accurately control the amount and direction of the liquid flow with resulting variation in the torque absorption of the impeller and providing a wide range of usable torque capacities with reasonable efficiency.

Referring to Fig. 25, the numeral 52 designates the power driven, rotating housing of the modified converter which is drivably connected to an impeller 53 whose discharge flows through an outer, reversely curved and unbladed passage 54 to the inlet of a turbine 55 keyed to an output shaft 56. The discharge of the turbine 55 flows through an inner, reversely curved and unbladed passage 57 to the inlet of a stator 58 and from the latter to the inlet of the impeller 53. So far as described, the modified converter is identical in every respect with that shown in Fig. 1, the difference residing in the adjustability of the stator blades 59.

For this purpose, an exterior control handle (not shown) is keyed to one end of a rock shaft 60 operable through a suitable housing 61 and the opposite end of this shaft is secured to a gear segment 62 that constantly meshes with a gear segment 63 fast on one end of a rock shaft 64.

The opposite end of the latter shaft includes a gear segment 65 (see Figs. 25 and 27) that meshes with a gear segment 66 formed interiorly of an external ring gear 67 that encircles and is coaxial with the output shaft 56, and is suitably held against axial movement between the stator end ring 68 and an annular flange 69 forming part of a stationary sleeve 70 through which the rock shaft 64 extends.

The externally toothed part of the ring gear 67 meshes with one set of circumferentially spaced gears 71, each of which is journaled in the end ring 68 and is fast on a pintle 72 which extends from one end of a companion stator blade 59 having at the opposite end a pintle 73 journaled in the stator core ring 74. The ring gear 67 also meshes with another set of circumferentially spaced gears 75, each having a hub 76 journaled in the flange 69 and fast on a pintle 77 which forms a part of that stator blade which is next to the blade 59 specifically shown in Fig. 25. In other words, the gears 71 are connected to alternate stator blades 59 and the gears 75 are connected to the intervening stator blades and, due to the close spacing of these blades, the gear sets comprising the gears 71 and 75 are offset with respect to each other and adjacent pairs of these gears overlap as shown in Figs. 25 and 27.

It is apparent from the foregoing that rotation of the ring gear 67 effects a rotating movement of the stator blades 59 with each blade rotating precisely through a selected angle which is equal for all the blades 59 and providing an accurate control on the quantity of liquid flowing between the blades 59. As schematically shown in Fig. 26, the limiting positions of the stator blades 59 are that in which the quantity "Q" is a maximum and that in which the blades 59 are fully closed.

The utility of this construction is exemplified by a type of harvester which commonly employs mechanical drives to the wheels and cutter bars. If the stand of grain is heavy, the lugging of the engine may be so severe as to reduce the power available for moving the harvester and also cutting the grain. However, with the variable stator mechanism, power through the converter for establishing forward motion of the harvester could be reduced by partially or fully closing the stator blades 59, so that power from the engine would be available for the cutter bars by way of an engine power take-off. Flexibility of control is therefore an outstanding characteristic of this type of unit due to the essentially valving control on the working liquid by the stator blades 59.

Performance curves of a typical Fig. 25 converter are shown in Figs. 28 to 31, inclusive, and demonstrate a minimum peak efficiency of 70% or more over a torque capacity range of about 4:1.

A further consideration involved in this invention is concerned with the recognition of the secondary liquid flow that exists in the flow channels of an impeller which, for any given blade shape and outlet angle thereof, lessens the torque capacity of the unit. This secondary flow is due to the frictionless character of the liquid particles and the centrifugal forces acting on these particles.

The situation is schematically and vectorially shown in Fig. 32 wherein the numeral 78 designates the secondary flow which occurs between two adjacent impeller blades 79. By way of example, the latter are shown as being the so-called forward bent type having a substantially higher outlet angle than the impeller blade 15 shown in Fig. 12. Forward bent blades have heretofore been employed to increase the torque capacity of a converter for a given size, but at the expense of a less efficient flow past the blade, particularly on the trailing or low pressure side of the blade from which the liquid tends to separate.

The vector and other values shown in Fig. 32 are defined as follows:

$R_1$ = Rotation radius of blade inlet tip
$R_2$ = Rotation radius of blade outlet tip
$U_s$ = Velocity of secondary flow in blade channel
$U$ = Peripheral velocity of blade tip
$v$ = Liquid velocity relative to blade
$V$ = Resultant absolute liquid velocity
$Cu$ = Tangential component of absolute liquid velocity The quantities U, $v$, V, and $Cu$ additionally carry subscripts 1 or 2, depending upon whether they apply to the inlet or outlet tips, respectively of the blades.

From Fig. 32, it is apparent that the direction of the secondary velocity vector $U_s$ is opposite to the tangential component $Cu_2$ which the blade tip is attempting to impress on the flowing liquid. Hence, the relative liquid velocity $v_2$ leaves the outlet tip of the blade at some angle less than the blade outlet angle, the angle between $v_2$, theoretical and actual, being known as the deflected angle.

The theoretical torque available at some impeller speed is expressed by the following equation:

Torque = (Flow in cu. ft./sec.) (Change in whirl through the impeller)

or $$T = Q\frac{w}{g}(Cu_2 \text{ (theoretical) } R_2 - Cu_1 R_1)$$

and in which $Q$ = Flow
$w$ = Specific weight of liquid
$g$ = Gravitational constant
$Cur$ = Whirl (inlet or outlet)

However, since the vectorial analysis in Fig. 32 shows that the deflected relative liquid velocity $v_2$ produces an actual value of $Cu_2$ smaller than "$Cu_2$" (theoretical), the outlet whirl quantity $Cu_2$(actual)$R_2$ will be less and likewise the torque.

It has been determined that interposing relatively small blades in optimum positions between the principal impeller blades will sufficiently break up and reduce the secondary flow between the principal blades to provide a higher torque for any given angular setting of the blades than would otherwise be obtainable. This solution is schematically shown in Figs. 33 and 34 to which reference will now be made.

Alternating with the principal blades 79 are intermediate blades 80 which are spaced generally midway of the principal blades and whose outlet tips are at the same radius as the corresponding tips of the principal blades 79, while the inlet tips are at a greater radius than the corresponding tips of the blades 79.

For best results, certain flow channel area relations must be established between the inlet tip of the intermediate blade 80 and the trailing and pressure faces of the adjacent principal blades 79—79, and also at the inlet of the channel between the latter blades as schematically shown in Figs. 33 and 34. Specifically, inscribed circles having diameters $D_1$ and $D_2$ are tangent to the inlet tip of the intermediate blade 80 and the trailing and pressure faces of the adjacent principal blades 79, respectively, and a like circle having a diameter $D_3$ is tangent to the trailing face of one blade 79 and the tip of the next blade 79. The quantities $D_1$, $D_2$ and $D_3$ each represents one dimension of the flow channels in the indicated locations. The other dimensions, or what may be termed the width, of these channels are shown in the channel profile in Fig. 34 at radii $R_1$, $R_2$ and $R_3$ and are designated as $W_1$, $W_2$ and $W_3$, respectively.

The flow channel area in the indicated locations, termed

"A" with appropriate subscripts, may then be written as follows:

$$A_1 = D_1 W_1 \quad A_2 = D_2 W_2 \quad A_3 = D_3 W_3$$

The relationship between the areas must satisfy the following equations:

$$A_2 = 1.0 \text{ to } 1.20 \, A_1 \quad (1)$$
$$A_1 + A_2 = 1.0 \text{ to } 1.15 \, A_3 \quad (2)$$

Hence with a given value for $D_3$ and selected channel widths $W_1$, $W_2$ and $W_3$, Equations 1 and 2 will provide the required values for $D_1$ and $D_2$.

Specimen and dimensioned principal and intermediate blades 79 and 80 are shown in Figs. 35 and 36, respectively. Comparative performance curves for a 15" converter with and without the intermediate blades 80 are shown in Fig. 37. Assuming twenty-eight blades 79 and a like number of blades 80, inlet and outlet angles for each blade 79 having values of 34° and 90°, respectively, a value for $D_3$ of .569" and the circuit being otherwise dimensioned as shown in Fig. 33 and as discussed for the Fig. 1 converter produces the primary torque and efficiency curves shown dotted in Fig. 37. The same curves for the same size converter, but without the intermediate blades 80, are shown full in the same figure. In the arrangement shown, the intermediate blades 80 increase the capacity of the converter about ten percent.

The intermediate blades 80 also have substantial utility when used with radial outlet, impeller blades, or generally an impeller blade having a substantially higher outlet angle than that shown, for example, in Fig. 17. Specifically, the intermediate blades 80 would have utility where the outlet angles of the principal blades 79 range from 60° to 120° and particularly in the range from 90° to 120°. The outlet angles of the intermediate blades would be characterized by the same degree range and would be identical for any given principal blade.

Further, and referring again to the position of each intermediate blade 80 between a pair of adjacent principal blades 79, the area relationships $A_1$ and $A_2$ are maintained for the length of the channels on opposite sides of the intermediate blade 80, or as expressed in Equation 1 above. It is recognized that in a forward or backward bent channel, the outlet tip of the intermediate blade may not be precisely midway between the corresponding tips of the principal blades 79.

We claim:

1. An hydraulic torque converter of the single stage type comprising a rotatable bladed impeller, a rotatable bladed turbine and a bladed stator arranged to form a toroidal liquid circuit, the impeller and stator being located in the outward flow part of the circuit with the outlets of the stator blades being disposed closely adjacent the inlets of the impeller blades and the turbine being located in the inward flow part of the circuit, the outlets and inlets of the impeller and turbine blades and the outlets and the inlets of the turbine and stator blades being respectively connected by U-shaped, outer and inner, unbladed passages, each blade at the mean stream flow line of the circuit having an inlet and an outlet angle measured respectively between the tangent to the mean camber line of the blade and the tangents to circles determined by the radii of the inlet and outlet tips of the blade, the impeller and turbine blades, and the stator blades, being inclined counted to and in the rotation direction of the impeller, respectively, the inlet and outlet angles for the impeller ranging from 25° to 45° and 36° to 90°, respectively, for the turbine from 32° to 65° and 22° to 35°, respectively, and for the stator from 77° to 85° and 25 to 35°, respectively.

2. An hydraulic torque converter as defined in claim 1 wherein the impeller has from 16 to 26 blades, the turbine from 22 to 30 blades, and the stator from 38 to 48 blades.

3. An hydraulic torque converter as defined in claim 1 wherein the average thickness of each impeller blade is from 8 to 12% of its chordal length.

4. An hydraulic torque converter as defined in claim 1 wherein the transverse area of the outer, unbladed passage is reduced from 10 to 15% between the outlet and inlet of the impeller and turbine, respectively, and the transverse area of the inner, unbladed passage is substantially constant between the outlet of the turbine and the inlet of the stator, respectively.

5. An hydraulic torque converter comprising a rotatable bladed impeller, a rotatable turbine and a bladed stator arranged to form a toroidal liquid circuit including radial outward and inward flow portions connected by U-shaped, outer and inner, unbladed passages, the impeller and stator being located in the outward flow part of the circuit with the outlets of the stator blades being disposed closely adjacent the inlets of the impeller blades and the turbine being located in the inward flow part of the circuit, the impeller blades bridging between a first core ring and a first end ring convergingly related in the direction of flow, the turbine blades bridging between a second core ring and a second end ring divergingly related in the direction of flow and the stator blades bridging between parallel, third core and end rings, the impeller and turbine blades and associated core and end rings being related to limit the increase in the flow channel area between the inlet and outlet of each adjacent pair of impeller blades and the decrease in flow channel area between the inlet and outlet of each adjacent pair of turbine blades up to about 30% and 25%, all respectively, of that normally determined by an unvarying relation of said rings, each blade having an inlet and an outlet angle measured at the mean stream flow line of the circuit respectively between the tangent to the mean camber line of the blade and the tangents to circles determined by the radii of the inlet and outlet tips of the blade, the impeller and turbine blades, and the stator blades, being inclined counter to and in the rotation direction of the impeller, respectively, the inlet and outlet angles for the impeller ranging from 25° to 45° and 36° to 90°, respectively, for the turbine from 32° to 65° and 22° to 35°, respectively, and for the stator from 77° to 85° and 25° to 35°, respectively.

6. An hydraulic torque converter as defined in claim 5 wherein the impeller has from 16 to 26 blades, the turbine from 22 to 30 blades, and the stator from 38 to 48 blades.

7. An hydraulic torque converter as defined in claim 5 wherein the transverse area of the outer, unbladed passage is reduced from 10 to 15% between the outlet and inlet of the impeller and turbine, respectively, and the transverse area of the inner, unbladed passage is substantially constant between the outlet of the turbine and the inlet of the stator.

References Cited in the file of this patent

UNITED STATES PATENTS

| | | |
|---|---|---|
| 1,760,397 | Coats | May 27, 1930 |
| 2,168,862 | Sensaud de Lavaud | Aug. 8, 1939 |
| 2,185,498 | Carson et al. | Jan. 2, 1940 |
| 2,190,830 | Dodge | Feb. 20, 1940 |
| 2,292,384 | Lysholm | Aug. 11, 1942 |
| 2,306,758 | Schneider et al. | Dec. 29, 1942 |
| 2,357,338 | Lysholm | Sept. 5, 1944 |
| 2,379,015 | Lysholm | June 26, 1945 |
| 2,694,950 | Guentsche et al. | Nov. 23, 1954 |

FOREIGN PATENTS

| | | |
|---|---|---|
| 1,002,800 | France | Nov. 7, 1951 |